US006481732B1

(12) United States Patent
Hawkins et al.

(10) Patent No.: US 6,481,732 B1
(45) Date of Patent: Nov. 19, 2002

(54) SUSPENSION SYSTEM FOR A VEHICLE HAVING A DECOUPLABLE STABILIZER BAR

(75) Inventors: Jim Hawkins, Cookeville, TN (US); Mark Clements, Lapeer, MI (US); Chris Keeney, Troy, MI (US); Joe Fader, Brighton, MI (US); Steve Yollick, Troy, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/578,253

(22) Filed: May 24, 2000

(51) Int. Cl.$^7$ ............................................. B60G 21/05
(52) U.S. Cl. ................................ 280/124.106; 280/5.5
(58) Field of Search ........................... 280/5.5, 5.502, 280/5.507, 5.508, 5.51, 5.511, 124.106–124.107, 689

(56) References Cited

U.S. PATENT DOCUMENTS

| | | | | |
|---|---|---|---|---|
| 3,240,306 A | * | 3/1966 | Armstrong | 192/84 |
| 3,629,754 A | * | 12/1971 | Sobottka | 335/253 |
| 4,206,935 A | | 6/1980 | Sheppard et al. | 280/723 |
| 4,284,183 A | * | 8/1981 | Brisabois et al. | 192/48.92 |
| 4,418,931 A | * | 12/1983 | Howard | 280/94 |
| 4,534,577 A | * | 8/1985 | Howard | 280/90 |
| 4,588,198 A | * | 5/1986 | Kanazawa et al. | 280/90 |
| 4,648,620 A | | 3/1987 | Nuss | 280/689 |
| 4,805,929 A | | 2/1989 | Shibata et al. | 280/721 |
| 4,834,419 A | | 5/1989 | Kozaki et al. | 280/707 |
| 5,217,245 A | | 6/1993 | Guy | 280/689 |
| 5,505,480 A | | 4/1996 | Pascarella | 280/689 |
| 5,678,672 A | * | 10/1997 | Sudau | 192/84.1 |
| 5,794,966 A | * | 8/1998 | MacLeod | 280/714 |
| 6,022,030 A | * | 2/2000 | Fehring | 280/5.511 |
| 6,149,166 A | * | 11/2000 | Struss et al. | 280/5.511 |

* cited by examiner

Primary Examiner—Avraham Lerner
Assistant Examiner—Paul Royal, Jr.
(74) Attorney, Agent, or Firm—Carlson, Gaskey & Olds

(57) ABSTRACT

A suspension system includes a stabilizer bar having a first and a second segment attached to respective vehicle suspension members. The first and a second segments are selectively coupled by a decoupler assembly to provide coordinated or uncoordinated movement of the first and second suspension members. The decoupler assembly is preferably in communication with a controller and sensors located adjacent the vehicle wheel assemblies. The controller interprets the signals from the sensors and determines whether the decoupler assembly should be activated. In some embodiments, a limited slip can be achieved between said first and second stabilizer bar segments.

20 Claims, 4 Drawing Sheets

SUSPENSION SYSTEM FOR A VEHICLE HAVING A DECOUPLABLE STABILIZER BAR

BACKGROUND OF THE INVENTION

The present invention relates to a suspension system for a vehicle, and more specifically to a stabilizer bar that can be selectively decoupled.

Vehicles are commonly equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle.

Typically, the stabilizer bar is an elongated member oriented to extend laterally across the vehicle with a first and second segment extending longitudinally at each end of the central segment. The central segment of the stabilizer bar is supported for rotation about its own longitudinal axis by one or more mounting brackets which are fixed to the vehicle body or frame. Each longitudinal segment is attached to a suspension member such as a control arm of the suspension system by an end link.

When the vehicle is subjected to a lateral rolling force such as, for example, while the vehicle negotiates a turn, the longitudinal segments pivot in opposite directions with respect to the longitudinal axis of the central segment. As a result, torsional reaction forces are generated which act through the segments to urge the suspension members to move toward their normal position. Thus, the vehicle body will be prevented from excessive rolling or leaning to either side by the torsional resistance produced by the stabilizer bar.

A relatively large diameter stabilizer bar offers greater resistance to roll than a relatively small diameter bar. A drawback of a large diameter stabilizer bar is that while roll resistance is improved, ride quality decreases as an impact harshness of wheel disturbances from road inputs is increased. A relatively small diameter stabilizer bar inputs less impact harshness to a vehicle, but does not provide as much roll resistance.

Although desirable from a handling perspective, the effect of a stabilizer bar can be undesirable when the suspension system is subjected to a sharp input force, such as when one wheel of the vehicle strikes a curb, pothole or the like. Because the stabilizer bar transmits the input from one wheel to the other, suspension system harshness is increased and both sides of the suspension system can be subjected to an extreme articulation. This is undesirable from a handling and maintenance perspective.

In one known system a primary stabilizer bar of small diameter is selectively increased in diameter by adding secondary torsional reaction segments. The secondary torsional reaction segments includes a clutch system to engage the various secondary segments with respect to each other and with the primary segment. However this known system requires relatively large diameter segments to be shifted along the primary segment to modify the torque reactive capacity of the primary reaction segment. Shifting of the large diameter segments requires a relatively long period of time which thereby reduces the reaction time of the suspension system. Further, movement of the large diameter segments requires a large actuator assembly which increases suspension system weight.

It is desirable to provide a lightweight stabilizer bar system having the roll resistance of a large diameter bar with the low impact harshness found in a small diameter bar or in a vehicle without a stabilizer bar. It would be particularly desirable to provide a stabilizer bar system which can quickly react to changes in road condition to provide immediately adaptable handling and ride characteristics.

SUMMARY OF THE INVENTION

The suspension system according to the present invention provides a stabilizer bar having a decoupler assembly. The suspension system includes a stabilizer bar having a central portion attached to a first and a second segment which is attached to respective vehicle suspension members by an end link.

The central portion includes a decoupler assembly. The decoupler assembly selectively allows for the coordinated or uncoordinated movement of the first and second segments. The decoupler assembly is preferably in communication with a controller and sensors located adjacent the vehicle wheel assemblies. The controller interprets the signals from the sensors and determines whether the decoupler assembly should be activated and to what degree.

A first embodiment of the decoupler assembly provides an electromechanical clutch assembly. Preferably, the electromechanical clutch assembly coordinates the first segment and second segment motion up to a predetermined input preferably optimized for normal driving conditions. However, when one of the segments is subjected to a force above the predetermined input, such as a curb impact, the decoupler assembly selectively decouples the first segment from the second segment. Shock resulting from the curb impact is thereby prevented from being transferred from the first segment to the second segment.

In another embodiment, the electromechanical clutch may be operated in a limited slip manner preferably in communication with the controller and sensors. The controller interprets the signals from the sensor and determines the degree to which the decoupler assembly should be activated. In response to the controller's interpretation of a signal from the sensor, the controller activates the decoupler assembly to provide a limited slip between the normally coordinated motion of the first and second segment. Variable activation of the decoupler assembly is thereby provided.

In another embodiment the first segment is coupled to the second segment by a piezo-electric coupling system. Under normal driving conditions a ring of piezo-electric material grips the male coupling and coordinates motion between the first segment and second segment. When the vehicle strikes a pothole or the like, the sensor identifies the force exerted upon the suspension member. The controller interprets the signals from the sensor and determines the degree to which the decoupler assembly should be activated. For example, if a relatively large pothole is struck, the controller will interpret a relatively high signal from the sensor and apply a first predetermined electric field through the ring of piezo-electric material such that the ring of piezo-electric material relaxes its grip on the male coupling. The first segment and second segment are thereby decoupled and the resulting shock is prevented from being transferred from the first segment to the second segment.

In another embodiment of the decoupler assembly, the first segment is coupled to the second segment by a magnetic coupling system. In this disclosed embodiment, a female coupling is electro-magnetically engageable with a male coupling. The female coupling is attached to the second segment and the first segment is attached to a male coupling. As described above, the controller interprets the signals from the sensor and determines the degree to which the decoupler assembly should be activated.

In yet another embodiment of the decoupler assembly, the first segment is coupled to the second segment by a solenoid decoupling system. In this disclosed embodiment, a receipt member is electro-magnetically engageable with a movable plunger. The movable plunger is attached to the second segment and the first segment is attached to receipt member. As described above, the controller interprets the signals from the sensor and determines the degree to which the movable plunger engages the receipt member.

Accordingly, the present invention provides a lightweight stabilizer bar system which can quickly react to changes in road condition to provide immediately adaptable handling and ride characteristics.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
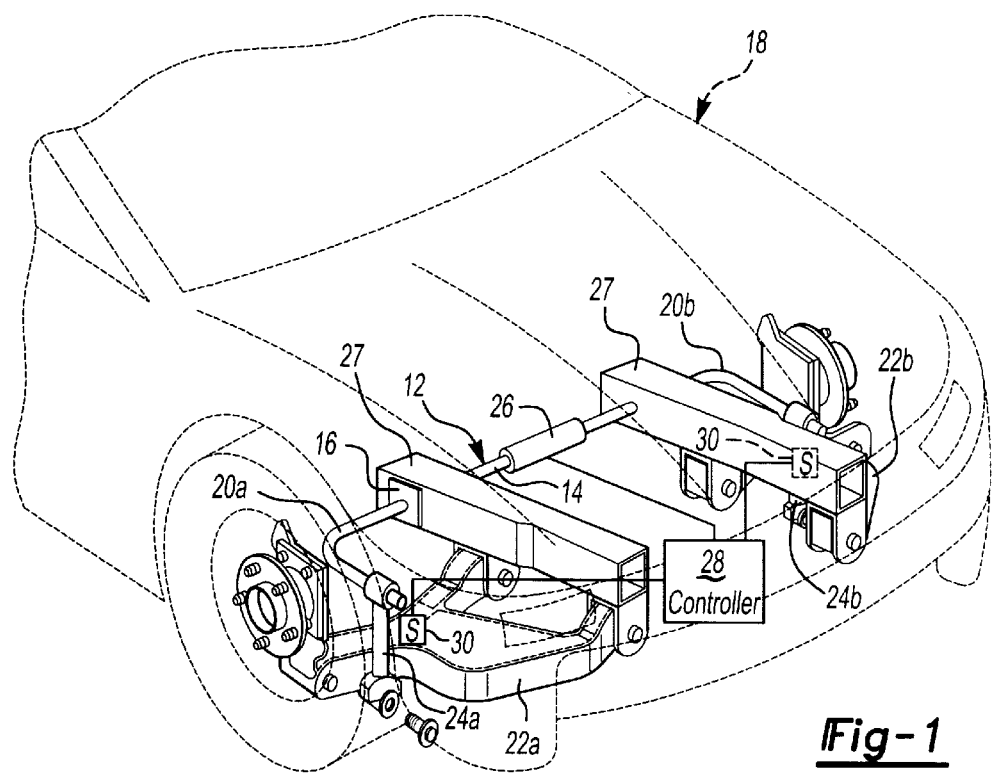
FIG. 1 is a general phantom view of a vehicle illustrating a suspension system having a stabilizer bar decoupler assembly.

FIG. 1 illustrates a schematic perspective view of a vehicle suspension system 10. In the disclosed embodiment, a stabilizer bar 12 includes a central portion 14 transversely mounted by brackets 16 in a vehicle 18 and having a first and second lateral segment 20A,20B. The segments 20A, 20B of the stabilizer bar 12 are attached to the suspension members 22A, 22B, by end links 24A, 24B.

Preferably, the central portion 14 of the stabilizer bar 12 includes a decoupler assembly 26. The decoupler assembly 26 selectively allows for the coordinated or uncoordinated movement of the first and second segments 20A, 20B. For example only, when the first suspension member 22A and first segment 20A are subjected to an extreme input such as impact with a pothole, the decoupler assembly 26 automatically decouples the first segment 20A from the second segment 20B. By so doing, the shock will not be transferred to the second segment 20B and second suspension member 22B.

The decoupler assembly 26 is preferably in communication with a controller 28 and sensors 30, shown schematically. The sensors 30 are preferably located adjacent the suspension members 22A, 22B, to sense motion of the suspension members 22A,22B. It should be understood that the motion of the suspension members can be interpreted from speed, distance moved, acceleration, or other data. The controller 28 interprets the signals from the sensors 30 and determines whether the decoupler assembly 26 should be activated and to what degree. The activation of the decoupler assembly 26 can be provided as an on/off or a slip-like manner in response to movement of the suspension members.

Figure 2:
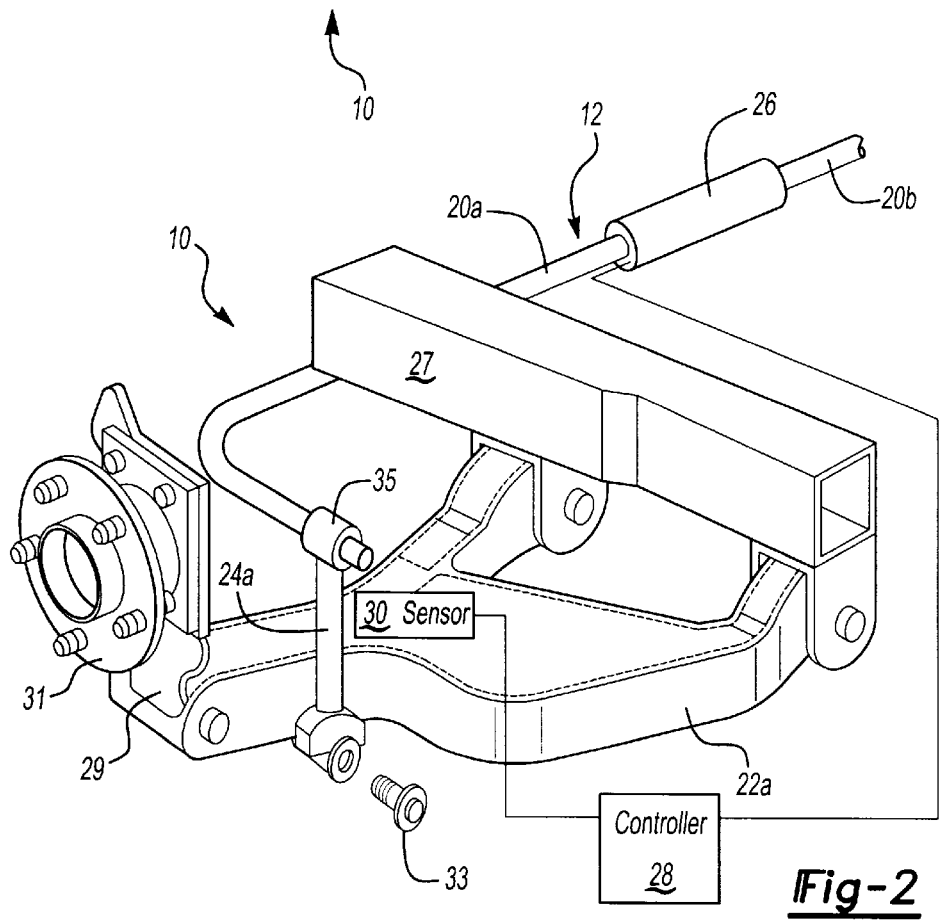
FIG. 2 is an expanded view of the vehicle suspension system of FIG. 1.

An expanded view of the suspension member 22A is illustrated in FIG. 2. The suspension system 10 includes a frame member 27 along the longitudinal axis of the vehicle 18. The suspension member 22A is pivotally connected to a knuckle 29 which supports a wheel mounting assembly 31. When the wheel (not illustrated) mounted on the wheel mounting assembly 31 travels in jounce and rebound, the suspension members 22A pivots with respect to the frame member 27 in a known manner.

The end link 24A connects the suspension member 22A with the stabilizer bar 12. A lower portion of the end link 24A is attached to the suspension members 22A by a fastener 33 or the like. The upper portion of the end link 24A includes a barrel portion 35 to receive the first segment 20A of the stabilizer bar 12. It should be understood that other types of attachment elements for the stabilizer bar 12 can also be substituted.

Figure 3:
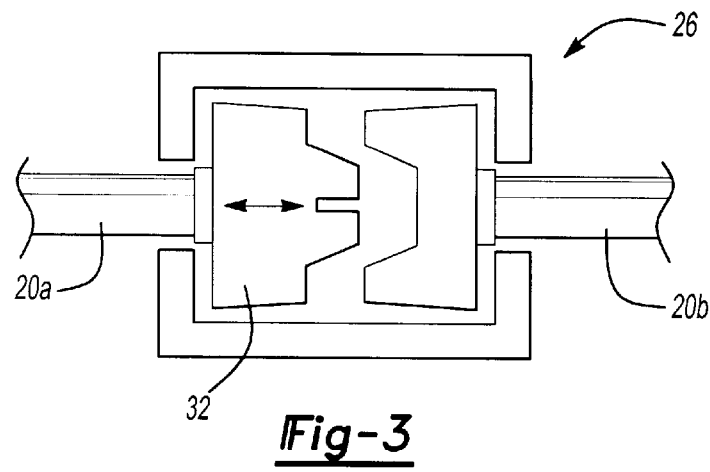
FIG. 3 is an expanded view of one stabilizer bar decoupler assembly according to the present invention.

Referring to FIG. 3 a first embodiment of the decoupler assembly 26 is illustrated. In this disclosed embodiment the first segment 20A is coupled to the second segment 20B by an electromechanical clutch assembly 32. Electromechanical clutches are well known in the art of transmissions, limited slip differentials, and the like. The details of such clutches are known and will not be discussed here in detail. However, it should be realized that the term clutch assembly should not be considered limiting in nature and should be interpreted to include mechanical, fluid, magnetic, electrical and other selectively decouplable systems.

Preferably, the electromechanical clutch assembly 32 transmits the first segment 20A and second segment 20B motion up to a predetermined input preferably optimized for normal driving conditions. However, when one of the segments 20A, 20B is subjected to a force above the predetermined input, such as a curb impact, the control 28 actuates the electromechanical clutch assembly 32 to selectively decouple movement of the first segment 20A from the second segment 20B. Shock resulting from the impact is thereby prevented from being transferred from the first segment 20A to the second segment 20B.

Alternatively, the electromechanical clutch 32 is operated in a proportional manner preferably in communication with the controller 28 and sensors 30 (FIG. 1). The controller 28 interprets the signals from the sensor 30 and determines the degree to which the decoupler assembly 26 should be activated. For example only, should the controller 28 interpret a relatively low signal from the sensor 30, the controller 28 allows a limited slip between the normally coordinated motion of the first 20A and second segment 20B. However should the controller 28 interprets a relatively high signal from the sensor 30, the controller can completely decouple the stabilizer bar 12 and thereby decouple motion of the first and second segment 20A,20B.

Figure 4:
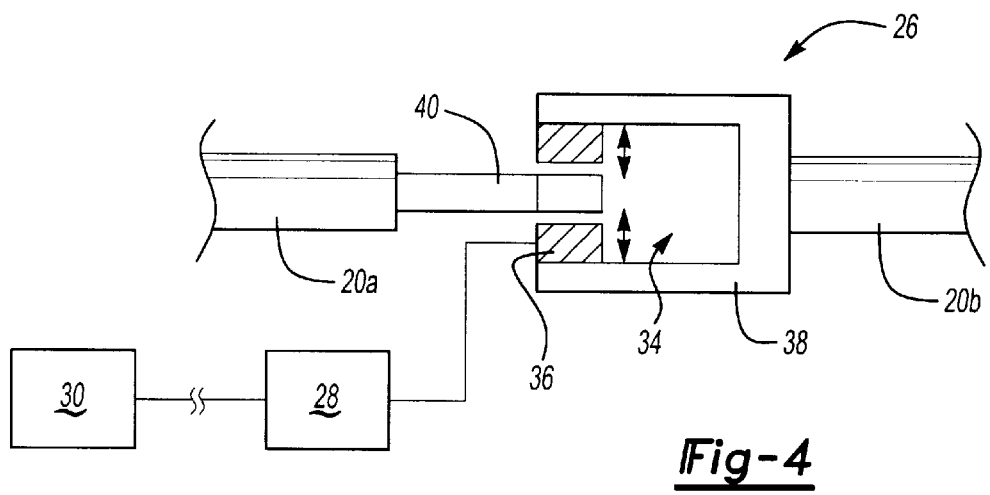
FIG. 4 is an expanded view of another stabilizer bar decoupler assembly according to the present invention.

Referring to FIG. 4 a second embodiment of the decoupler assembly 26 is illustrated. In this disclosed embodiment the first segment 20A is coupled to the second segment 20B by a piezo-electric coupling system 34. In the disclosed embodiment, a ring of piezo-electric material 36 is contained in a female coupling 38. The female coupling is attached to the second segment 20B. The first segment 20A is attached to a male coupling 40 which fits into the ring of piezo-electric material 36. It should be understood the male coupling could carry the piezo material. Piezo-electric materials are known. Generally, when an electric field is applied to a piezo-electric material, the piezo-electric material changes shape. The distance (shown schematically as d in FIGS. 4A, 4B, and 4C) between the piezo-electric material 36 and the male coupling 40 defining the slip between the normally coordinated motion of the first 20A and second segment 20B. Preferably, selective activation of the piezo-electric material 36 is controlled by the controller 28.

Figures 4A, 4B, 4C:
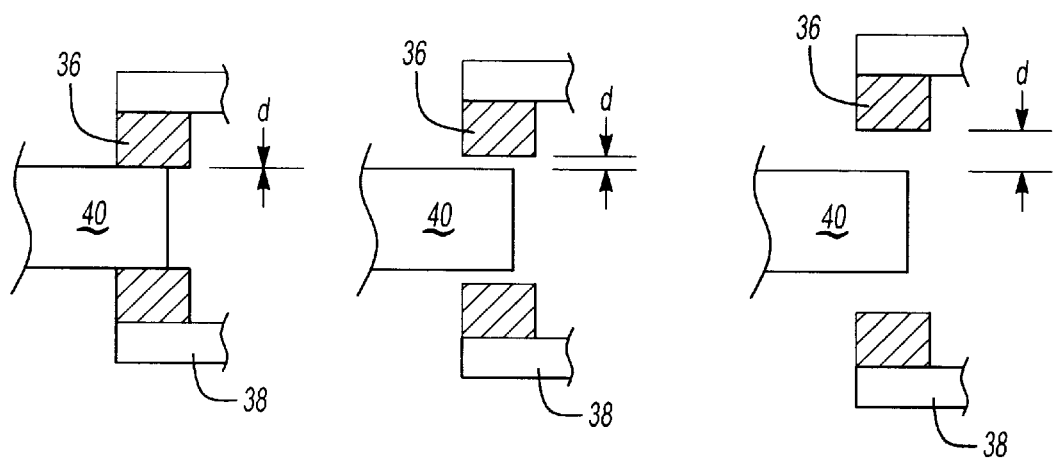
FIG. 4A is an expanded view of the decoupler assembly of FIG. 4 in a first position.
FIG. 4B is an expanded view of the decoupler assembly of FIG. 4 in a second position.
FIG. 4C is an expanded view of the decoupler assembly of FIG. 4 in a third position.

As shown in FIG. 4A, under normal driving conditions the ring of piezo-electric material 36 engages the male coupling 40 and coordinates motion between the first segment 20A and second segment 20B. When the vehicle strikes a pothole or the like, the sensor 30 identifies the motion of the suspension member 22. The controller 28 interprets the signals from the sensor 30 and determines the degree to which the decoupler assembly 26 should be activated. For example, FIG. 4B, illustrates the controller 28 interoperation of a relatively low signal from the sensor 30. The controller 28 applies a first predetermined electric field through the ring of piezo-electric material 36 such that the distance d between the ring of piezo-electric material 36 is relatively small and allows a limited slip between the normally coordinated motion of the first 20A and second segment 20B. By accordingly controlling distance d the quantity of slip between the ring of piezo-electric material 36 and the male coupling 40 is thereby controlled.

Referring to FIG. 4C, if a relatively large pothole is struck, the controller 28 will interpret a relatively high signal from the sensor 30. The controller may respond to the signal and apply a second predetermined electric field through the ring of piezo-electric material 36 such that the distance d between the ring of piezo-electric material 36 increases and disengages the ring of piezo-electric material 36 from the male coupling 40. The first segment 20A and second segment 20B are thereby completely decoupled and the resulting shock is prevented from being transferred from the first segment 20A to the second segment 20B.

Figure 5:
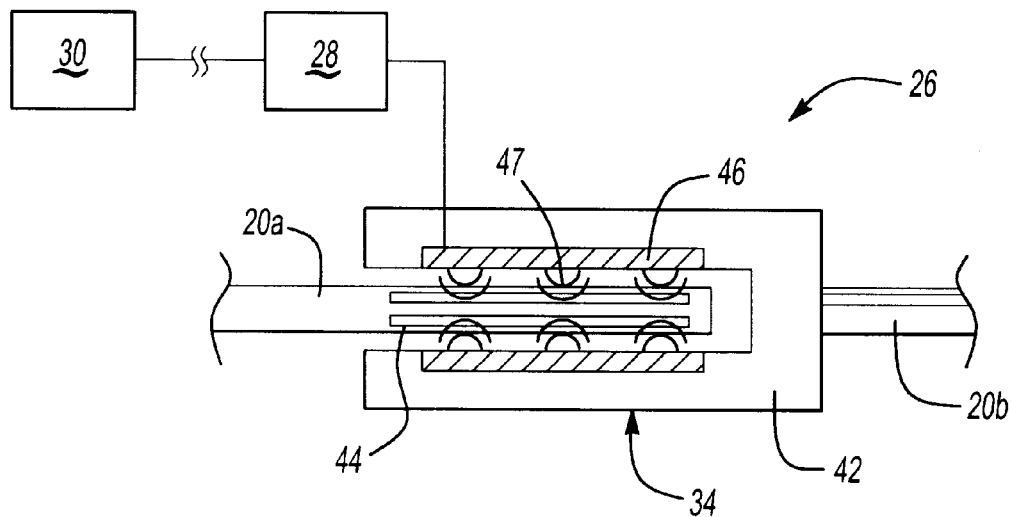
FIG. 5 is an expanded view of another stabilizer bar decoupler assembly according to the present invention.

Referring to FIG. 5 another embodiment of the decoupler assembly 26 is illustrated. In this disclosed embodiment the first segment 20A is coupled to the second segment 20B by an electro-magnetic coupling system 34. The magnetic coupling system 34 preferably includes a female coupling 42 having an electromagnet 46 that generates an electromagnetic field (shown schematically at 47). The female coupling is attached to the second segment 20B and the first segment 20A is attached to a male coupling 44.

Preferably, under normal driving conditions the electromagnetic field 47 electro-magnetically engages the male coupling 44 and coordinates motion between the first segment 20A and second segment 20B. As described above, the controller 28 interprets the signals from the sensor 30 and determines the strength of the electro-magnetic engagement between the female coupling 42 and the male coupling 44 to provide a controlled limited slip therebetween.

Figure 6:
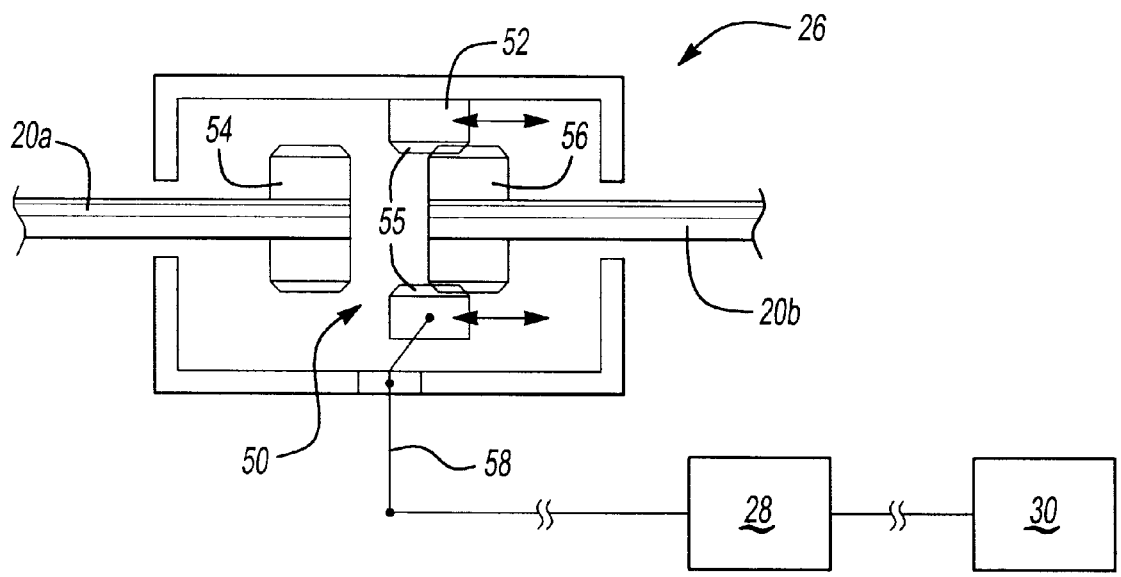
FIG. 6 is an expanded view of another stabilizer bar decoupler assembly according to the present invention.

Referring to FIG. 6 another embodiment of the decoupler assembly 26 is illustrated. In this disclosed embodiment the first segment 20A is coupled to the second segment 20B by a mechanical dog clutch 50. As known, the clutch 50 includes a movable collar 52 that slideably engages a first gear 54 on the first segment 20A with a second gear 56 on the second segment 20B in a known manner. Teeth 55 on collar 52 selectively engage teeth on gear 54. Collar 52 rotates with gear 56. The controller 28 controls movement of the collar 52 by a linkage 58 or the like in response to sensor 30. As described above, the controller 28 interprets the signals from the sensor 30 and controls movement of the collar 52 to allow relative rotation between the first gear 54 and the second gear 56. This embodiment may not allow limited slip.

Figure 7:
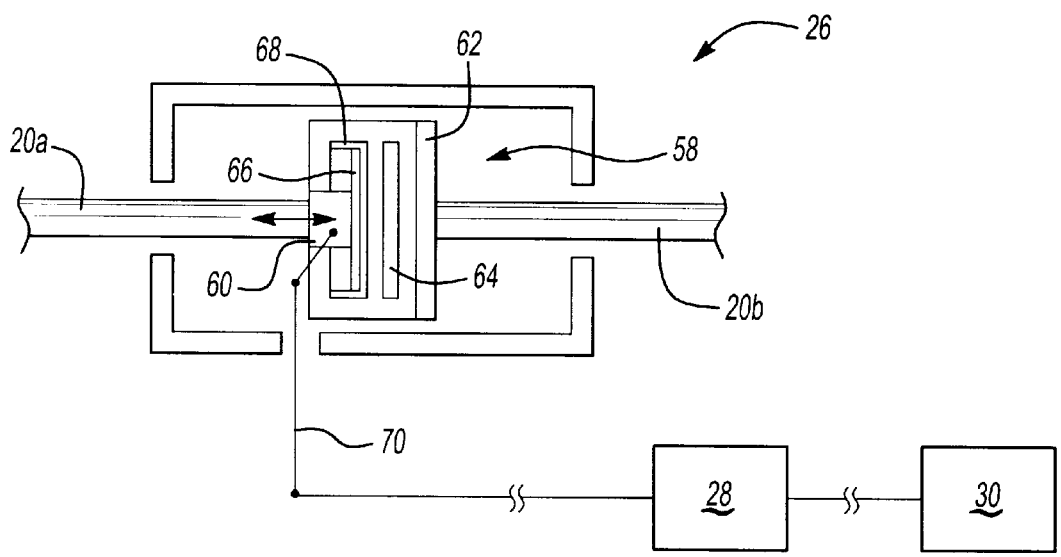
FIG. 7 is an expanded view of another stabilizer bar decoupler assembly according to the present invention.

Referring to FIG. 7, another embodiment of the decoupler assembly 26 is illustrated. In this disclosed embodiment the first segment 20A is coupled to the second segment 20B by a disk clutch 58. Disk clutches are known and typically include a release bearing 60, flywheel 62, a friction disk 64, a spring 66 and a pressure plate 68. The controller 28 in response to sensor 30 controls movement of the release bearing 60 by a linkage 70 or the like. Generally, the release bearing 60 acts upon the spring 66 to bring the pressure plate 68 and the friction disk 64 into or out of contact with the flywheel 62. As described above, the controller 28 interprets the signals from the sensor 30 and controls movement of the release bearing 60 to provide the desired limited slip between the first segment 20A is coupled to the second segment 20B.

Figure 8:
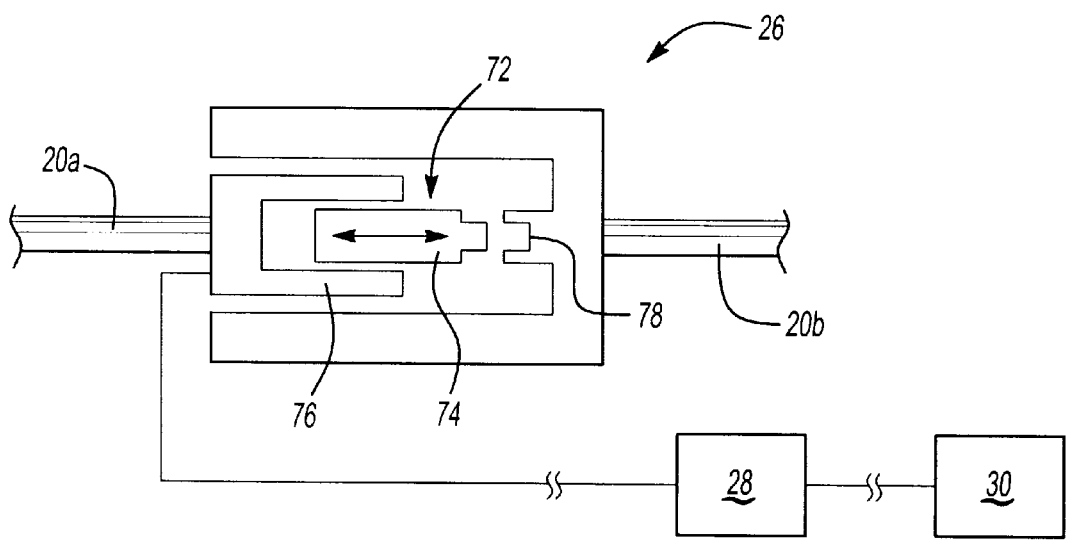
FIG. 8 is an expanded view of yet another stabilizer bar decoupler assembly according to the present invention.

Referring to FIG. 8, yet another embodiment of the decoupler assembly 26 is illustrated. In this disclosed embodiment the first segment 20A is coupled to the second segment 20B by an electromechanical solenoid 72. Solenoids are known and typically include a movable plunger 74 within an electromagnetic actuator 76. In this disclosed embodiment the electromagnetic actuator 76 supports the movable plunger 74. In this embodiment, plunger 74 preferably rotates with actuator 76. The second segment 20B includes a receipt member 78 that is selectively engageable with the plunger 74. As described above, the controller 28 interprets the signals from the sensor 30 and controls movement of the plunger 74 to engage the receipt member 78 to selectively couple and decouple the first segment 20A from the second segment 20B. Further, by controlling the force exerted between the plunger 74 and the receipt member 78, the solenoid 72 provides a controlled limited slip therebetween.

Accordingly, the present invention provides a stabilizer bar that has the roll resistance of a large diameter bar combined with the low impact harshness found in a vehicle without a stabilizer bar, without sacrificing either The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:
   a first and a second suspension member;
   a stabilizer bar having a first segment attached to said first suspension member and a second segment attached to said second suspension member to substantially couple motion of said first and second suspension members;

a first sensor connected to said first suspension member and a second sensor in communication with said second suspension members, said first and second sensors operable to sense a quantity indicative of a force encountered by at least one of said first and second suspension members; and a decoupler assembly attached to said first and said second stabilizer bar segment to selectively decouple said first and said second stabilizer bar segments in response to said first and second sensors to control relative rotation between said first and second stabilizer bar segments.

2. The suspension system as recited in claim 1, wherein said decoupler assembly is a clutch assembly.

3. The suspension system as recited in claim 2, wherein said decoupler assembly is electromechanical clutch assembly.

4. The suspension system as recited in claim 2, wherein said clutch assembly includes a dog type clutch.

5. The suspension system as recited in claim 2, wherein said clutch assembly is a disk type clutch.

6. The suspension system as recited in claim 1, wherein said decoupler assembly includes a solenoid.

7. The suspension system as recited in claim 1, wherein said decoupler assembly includes an electromagnetic coupling between said first and second stabilizer bar segments.

8. The suspension system as recited in claim 1, wherein said decoupler assembly includes a piezo-electric coupling between said first and second stabilizer bar segments.

9. The suspension system as recited in claim 1, wherein said decoupler assembly is operable in an on and off manner.

10. The suspension system as recited in claim 1, wherein said decoupler assembly provides a limited slip between said first and second stabilizer bar segments.

11. The suspension system as recited in claim 1, further comprising a controller in communication with said sensor and said decoupler assembly, said decoupler assembly actuatable by said controller when said sensor measures a predetermined input.

12. The suspension system as recited in claim 1, wherein said controller activates said decoupler assembly in response to said predetermined input to said sensor to achieve variable degrees of relative rotation between said first and second stabilizer bar segments.

13. The suspension system as recited in claim 1, wherein said decoupler assembly includes mechanical contact.

14. The suspension system as recited in claim 1, wherein said first sensor is adjacent an end link connected to said first suspension member and said second sensor is adjacent an end link connected to said second suspension member.

15. A suspension system for a vehicle comprising:

a first and a second suspension member;

a stabilizer bar having a first and a second stabilizer bar segment, said first and said second stabilizer bar segment respectively attached to said first and second suspension member to substantially couple motion of said first and second suspension members;

a decoupler assembly attached to said first and said second stabilizer bar segment to selectively decouple said first and second suspension members;

a first sensor in communication with said first suspension member and a second sensor in communication with said second suspension members, said first and second sensor operable to sense a quantity indicative of a force encountered by at least one of said first and second suspension members; and a controller in communication with said first and second sensor and said decoupler assembly, said controller operable to activate said decoupler assembly in response to said first and second sensor to achieve or prevent relative rotation between said first and second stabilizer bar segments.

16. The suspension system as recited in claim 15, wherein said decoupler assembly includes mechanical contact.

17. The suspension system as recited in claim 15, wherein said first sensor is adjacent an end link connected to said first suspension member and said second sensor is adjacent an end link connected to said second suspension member.

18. The suspension system as recited in claim 15, wherein said decoupler assembly provides a limited slip between said first and second stabilizer bar segments.

19. A method of controlling a characteristic of a vehicle suspension system including a stabilizer bar having first and second segments substantially coupling motion of a first and second suspension member comprising the steps of:

(1) selectively decoupling the first and second suspension members in response to a predetermined movement of one of said first and second suspension members; and (2) sensing displacement of an end link connected to said first suspension member and an end link connected to said second suspension member indicative of a force encountered by said one of said first and second suspension members.

20. A method as recited in claim 19, wherein said step (1) includes partially decoupling the first and second suspension members to provide a limited slip between the first and second stabilizer bar segments in response to said predetermined movement encountered by at least one of the suspension members.

* * * * *